(12) United States Patent
Mi et al.

(10) Patent No.: US 11,928,233 B2
(45) Date of Patent: *Mar. 12, 2024

(54) DISTRIBUTED DATA RIGHTS MANAGEMENT FOR PEER DATA POOLS

(71) Applicant: RateGain Adara, Inc., Dallas, TX (US)

(72) Inventors: Hongcheng Mi, Belmont, CA (US); Michael Baird Leavitt, Belmont, CA (US); Shuo Yang, Milpitas, CA (US); Hien Nguyen, Redwood City, CA (US)

(73) Assignee: RATEGAIN ADARA, INC., Dallas, TX (US)

( * ) Notice: Subject to any disclaimer, the term of this patent is extended or adjusted under 35 U.S.C. 154(b) by 155 days.

This patent is subject to a terminal disclaimer.

(21) Appl. No.: 17/389,090

(22) Filed: Jul. 29, 2021

(65) Prior Publication Data

US 2022/0019686 A1   Jan. 20, 2022

Related U.S. Application Data

(63) Continuation of application No. 16/423,502, filed on May 28, 2019, now Pat. No. 11,080,419.

(51) Int. Cl.
*H04L 9/40* (2022.01)
*G06F 21/62* (2013.01)
(Continued)

(52) U.S. Cl.
CPC ........ *G06F 21/6227* (2013.01); *G06F 21/645* (2013.01); *H04L 9/3247* (2013.01);
(Continued)

(58) Field of Classification Search
CPC ............... G06F 21/6227; G06F 21/645; G06F 2221/2141; G06F 2221/2151; H04L 9/3247; H04L 63/0442; H04L 9/50
See application file for complete search history.

(56) References Cited

U.S. PATENT DOCUMENTS 6,202,066 B1   3/2001 Barkley
10,824,747 B1 * 11/2020 Magerkurth .......... G06F 21/604
(Continued)

OTHER PUBLICATIONS

Leavitt, U.S. Appl. No. 16/001,913, filed Jun. 6, 2018, Notice of Allowance and Fees Due dated Aug. 25, 2021.
(Continued)

*Primary Examiner* — Ghodrat Jamshidi
(74) *Attorney, Agent, or Firm* — Jackson Walker LLP; Christopher J. Rourk

(57) ABSTRACT

Techniques are described for transaction-based read and write operations in a distributed system. In an embodiment, an authorization protocol overlaid onto a transaction to control access to each of the data pools. Using the techniques described herein, the DTRS provides authorization mechanism to ensure that the entity, which hosts the data pool, may only access the data set from an originating entity based at least upon the access rules of the originating entity set for the data set. Additionally, the DTRS's read/write transactions keep the data pools of the DTRS in synch with each other, so each data pool stores the same data sets as another data pool of the DTRS. When a data integrity service of an entity generates a new data entry from a user transaction with a client application, a new write request is generated for the DTRS to which the data integrity service belongs. The DTRS receives the data entry and its metadata from the data integrity service and performs steps to update all data pool of the DTRS, in an embodiment.

18 Claims, 6 Drawing Sheets

(51) Int. Cl.
*G06F 21/64* (2013.01)
*H04L 9/32* (2006.01)
*H04L 9/00* (2022.01)

(52) U.S. Cl.
CPC .. *H04L 63/0442* (2013.01); *G06F 2221/2141* (2013.01); *G06F 2221/2151* (2013.01); *H04L 9/50* (2022.05)

(56) References Cited

U.S. PATENT DOCUMENTS

| | | | |
|---|---|---|---|
| 2007/0294195 A1 | 12/2007 | Curry | |
| 2018/0077086 A1* | 3/2018 | Guim Bernat | H04L 49/103 |
| 2018/0121667 A1 | 5/2018 | Karpel | |
| 2018/0227119 A1* | 8/2018 | Bibera | H04L 9/3239 |
| 2018/0300508 A1* | 10/2018 | Zhang | G06F 12/0238 |
| 2019/0180039 A1* | 6/2019 | Considine | G06F 21/6218 |
| 2019/0229890 A1 | 7/2019 | Brehmer | |
| 2019/0319939 A1* | 10/2019 | Hamel | H04L 63/0807 |
| 2019/0377890 A1 | 12/2019 | Leavitt | |
| 2019/0384932 A1* | 12/2019 | Pratt | H04W 12/61 |
| 2020/0019718 A1* | 1/2020 | Lin | H04L 63/105 |
| 2020/0089671 A1 | 3/2020 | Padmanabhan | |
| 2020/0293375 A1* | 9/2020 | Klein | G06F 3/0605 |
| 2020/0374125 A1* | 11/2020 | Guillama | H04L 9/0894 |
| 2021/0075623 A1 | 3/2021 | Petersen | |
| 2022/0027495 A1 | 1/2022 | Leavitt et al. | |

OTHER PUBLICATIONS

Mi, U.S. Appl. No. 16/423,502, filed May 28, 2019, Notice of Allowance dated Mar. 31, 2021.

Leavitt, U.S. Appl. No. 16/001,913, filed Jun. 6, 2018, Final Office Action dated Jul. 7, 2020.

Leavitt, U.S. Appl. No. 16/001,913, filed Jun. 6, 2018, Office Action dated Mar. 20, 2020.

Leavitt, U.S. Appl. No. 16/001,913, filed Jun. 6, 2018, Notice of Allowance dated May 20, 2021.

* cited by examiner

System Diagram

Write Sequence

Read Sequence

DISTRIBUTED DATA RIGHTS MANAGEMENT FOR PEER DATA POOLS

BENEFIT CLAIM

This application claims the benefit under 35 U.S.C. § 120 as a Continuation of application Ser. No. 16/423,502, filed May 28, 2019, the entire contents of which is hereby incorporated by reference for all purposes as if fully set forth herein. The applicants hereby rescind any disclaimer of claim scope in the parent applications or the prosecution history thereof and advise the USPTO that the claims in this application may be broader than any claim in the parent applications.

FIELD OF THE INVENTION

The general technical field of the present disclosure is software-programmed computers in distributed systems. The technical field of the disclosure relates more specifically to distributed data pools.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

In general, the greater the number of data points, the more accurate the automated predictions based on the data points. For example, a data representation related to predicting a likelihood of consumption of an item by a user is determined by data related to the previous consumption(s) of this item or related items. The more data points exist for the previous consumptions, the more accurate is the determination.

As an example, an airline booking web application may present to the user different upgrade options for the user performing an airline booking to accept: first class upgrades; luggage upgrades; in-flight entertainment and dining options; and rental car, hotel, tour offers at the destination city. If all of these offers were to be presented to the user in the web application, the user might have negative experience due to being overwhelmed with irrelevant offers, and never book through the same application in the future. To make the offers relevant, the web application needs to have access to relevant data: data about the user previous travel or data about like-users previous travel data.

Although multiple computational methodologies exist for determining such data representations, the accuracy of these methodologies is still highly dependent on the amount of data, regardless of the methodologies used. Indeed, continuing with the same example, the airline booking application had only two previous visits by the user, no matter what accuracy and complexity statistical (e.g., artificial intelligence) model is used, the prediction will most likely be irrelevant. However, if the web application could access 100s or 1000s or records about the user's previous travel and millions of records of like-user's previous travel the accuracy of relevance is significantly improved.

Not all entities that desire to compute an accurate data representation have enough of their own data collected to ensure accuracy. In some cases, such entities have no data of their own at all. Without any data, no accurate prediction is possible, while using a lesser amount of data makes the resulting data representation less accurate.

One challenge with obtaining more data is the complex relationship among entities originating the data. Specific relationships may prevent entities from data sharing. For example, while arguably the best quality data is obtained from a competitor entity, the competitor entity most likely would not authorize such data transfer: one airline web application may not share data to make another, competitor, web application's offers more attractive. Similarly, regulations (such as privacy laws) that govern specific industries may place restrictions on entities for the type of data to be shared or even prevent sharing completely.

Even when entities have policies for sharing data, the shared data usually either resides with the originating entity or with a third party, which enforces the sharing policies. In both scenarios, the receiving entity experiences a significant communication delay. To access the shared data, computer systems of the receiving entity have to connect to remote networks of the third-party or the originating entity. Given the large amounts of data, such a connection may overload the networks and introduce significant delay in obtaining data.

Due to the communication delays and the inability to transfer a large amount of data on request, there is a substantial risk that the shared data is stale. Furthermore, the remote entity generally has to collect, aggregate and make the data available for the receiving entity. Such data processing may cause further delay and may make the data stale.

One approach is to periodically replicate every peer's shared data across the network, such that each peer has other peers' data locally stored in a local data store. Although, this may solve the delay in access problem, such an approach may lack consistency, reliability and timeliness.

For example, each of the replicated data stores need to consistently provide data according to the originating entity's access policy for the data, need to have the same state of the data and need to uniformly enforce the authorization across all data stores. The complexity is especially exacerbated when a change in one peer's access policy occurs and needs to be propagated across the peers. Due to race conditions, one peer may enforce a different policy for the same data entity then another peer which hasn't yet received the policy update. Such an inconsistency may result in unauthorized access of data.

Furthermore, a peer system may be running client applications that require timely (real-time) access to data. For example, if a user has established session with the peer's airline reservation application, a decision whether to offer the user an upgrade or a car rental offer has to be performed in a matter of seconds. Therefore, when the peer's system requests for data, not only the latest data from other peers need to be available but the enforcement of the data access policies has to be done in real-time. Only with such real-time processing, the peer's client application can timely service requests for a user.

Additionally, reliability in a distributed system of replicated data stores is particularly challenging. Failures in data operation requests are more probable when sent over a wide network such as internet, thus the distributed system has to provide failsafe mechanisms. To ensure that peer data stores have the same state while being distributed across the network, data updates have to be atomically replicated across the network of the replicated data stores.

The existing methodologies to address the above-stated technical problems, such as synchronization, significantly deteriorate the performance of the system as number of peer nodes grows. Some existing solutions sacrifice the consistency and/or reliability for sake of the timeliness or vice versa. To solve the above-mentioned and other technical problems, the improved techniques which shall be described hereafter have been developed.

DETAILED DESCRIPTION

Figure 1:
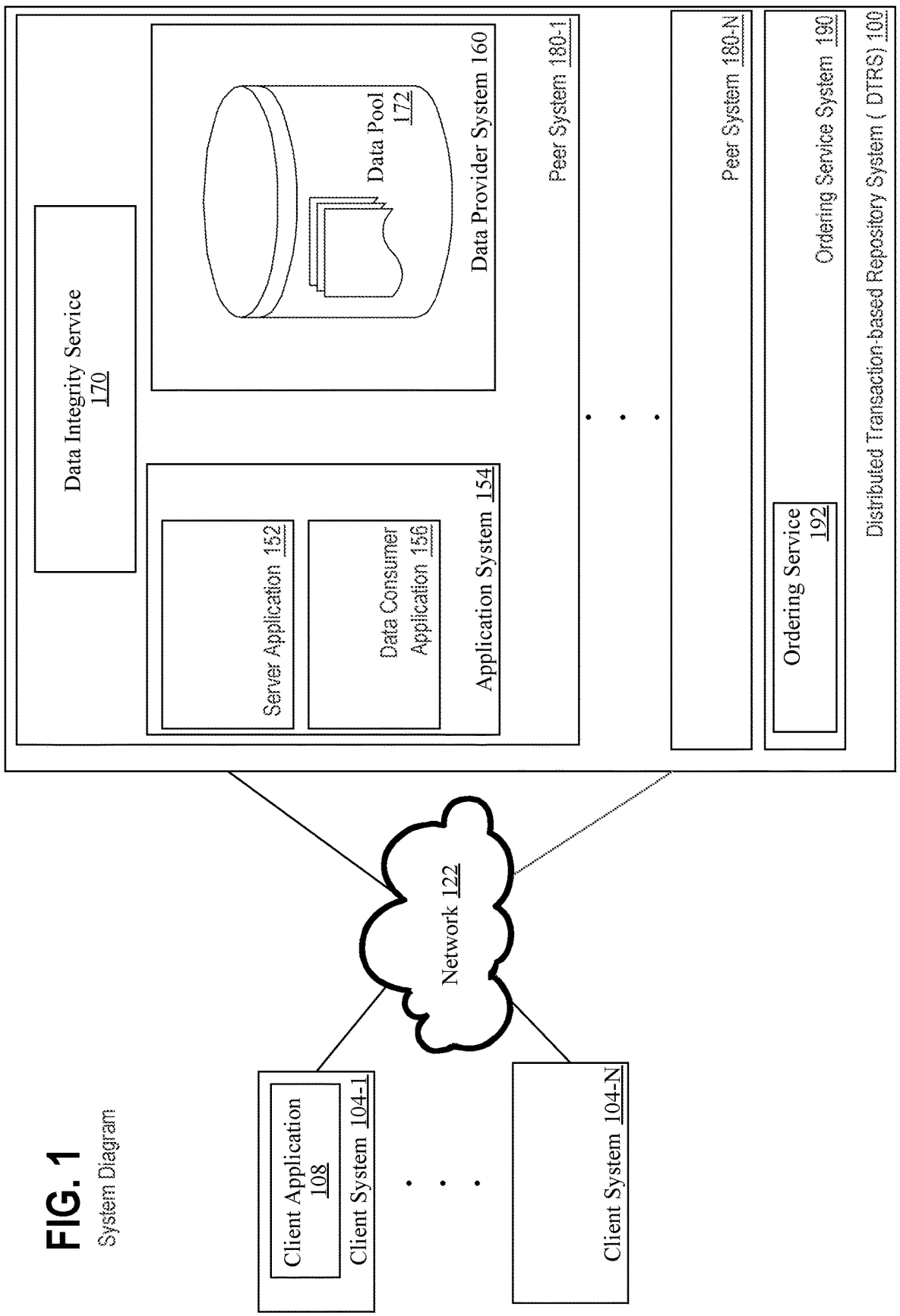
FIG. 1 is a block diagram that depicts a system environment for a distributed transaction-based repository system (DTRS), in an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Because complex relationships exist between multiple entities originating data, a single, central, data pool may aggregate the data, according to one embodiment. In such an embodiment, a data pool management system controls access to the data in the central data pool, as further described in "Rule Set-Based Authorization for Data Pool," U.S. application Ser. No. 16/001,913, filed on Jun. 6, 2018, the entire contents of which are hereby incorporated by reference. The term "data pool" refers herein to a collection of data that originated from multiple entities. Each data set of data pool is associated with an entity, which itself may represent a group of entities, in an embodiment.

For example, booking applications of different airlines, booking application of different rental car companies, and booking applications of different cruises may provide data that includes "User A" previous travel activity under their respective specified access policy to the data pool management system (DPMS). Even if "User A" may have only booked cruise ship travel in the past and never a rental car. When the "User A" logs into the rental car web application, the web application may query the data pool and retrieve cruise travel related data of "User A." Based on such data, the web application may provide appropriate offers that are relevant to "User A" for example a discount for the next cruise line to the Caribbean during the time period when "User A" usually likes to take cruise lines.

To improve the real-time aspect of data processing times and to reduce communication delays between a central data pool system and data consumer systems of peers, each peer entity's system may host its own data pool. Thus, a data consumer of the peer entity, rather than sending a request to a remote central data pool, may issue local requests for data. Similarly, the data provider of the peer entity may issue data updates to the local data pool, rather than the remote central data pool. The peer system manages the data pool for the entity and forms a network with the other peer systems of other entities that host their respective data pools, in an embodiment.

Continuing with the above example, a cruise travel web application and an airline web application may be part of respective peer systems of a network. An activity by "User A" on the cruise travel web application may be updated at its own local data pool as well as other data pools of the DTRS, e.g., the data pool of the peer airline web application. Similarly, an activity by "User A" on the airline web application is updated on its own data pool, the data pool of the peer system of the cruise travel web application and any other data pool of the DTRS. Accordingly, when, the airline web application needs data on "User A," the local data pool of the airline web application has the data about "User A" generated itself and by its peer applications such as the cruise web application.

To improve consistency, the data pools in the network are maintained with the same state of data. In an embodiment, a transaction-based data requests are used by peer systems to ensure consistency and reliability for updates to the data pools of the network. When an update is prepared and then committed as a transaction to each and every data pool of the network, the consistency of the data pools is achieved, and if the transaction fails, then no update happens on any data pool of the network, which makes the data pools consistent and the system itself reliable.

Additionally, peer systems in a distributed transaction-based repository system (DTRS) may intend to enforce an access policy on other entities for accessing its originated data. The policy may be different based on the type of data, or the origin of the data generated by the associated peer system, or who requests access to the data. For example, data generated from a user search may have different access policy for other peers than data generated from a completed user booking. To ensure consistency, reliability and real-time enforcement of data rights, novel access authorization control is necessary.

The DTRS may utilize transaction-based read and write operations to control access to each of the data pools using the techniques described herein. In an embodiment, for reliability and consistency in enforcement of access control policies, the DTRS operations utilize authorization protocol generated by the originating entity's peer system. The authorization protocol describes permissions granted or denied by the originating entity for accessing the data entry, to which the protocol data is attached and/or associated with. Since the DTRS replicates the data entry with the authorization protocol across each and every data pool of the DTRS, each peer system may consistently and reliably grant/deny access to the copies of the data entry based on the same authorization protocol of the originating entity. Thus, the DTRS provides authorization mechanism that enforces access policies on data even for the entity's own hosted data pool to assure that even the hosting entity cannot access its own hosted data unless authorized by the originating entity of the data.

Furthermore, the DTRS's read/write transactions also keep the data pools of the DTRS reliably in synch with each other, so each data pool stores the same data sets as other data pools of the DTRS. The read/write transactions are also recorded such that a complete log of transactions is maintained for performing consistency checks.

When a peer system of an entity generates a new data entry based on a user transaction with the entity's server application, a new write request is generated for the DTRS. The DTRS receives the data entry and its metadata from the peer system and performs steps to update the data pools of the DTRS including the entity's own local data pool. The update may also attach authorization protocol, with which each of the peer systems can authorize read requests for the data entry.

Accordingly, the DTRS provides consistency, real-time operations, and reliability based on techniques using originated data, meta-data (the authorization protocol data for the data) and authorization enforcement logic on each peer system.

For example, "User A" logs in into a web application of airline "XYZ" and performs a search for a destination city of "SFO." In response, a peer system of airline "XYZ" may generate a new write transaction for the DTRS. The write transaction is to update all the data pools of the DTRS including that of airline "XYZ" with the information about the "User A" search activity.

To consistently enforce access policy for the airline "XYZ", the DTRS generates authorization protocol data that describes the access policy for accessing the new data entry. The policy reflects the access restrictions that the originating entity has set for its data entries. According to the authorization protocol, the peer system of the entity generates a transaction proposal data that requests the DTRS to update the data pools with the data entry.

In an embodiment, the peer system of the originating entity encrypts a portion of the transaction proposal data using private security data associated with the entity. By encrypting the transaction data portion with the private security data of the entity, the peer system uniquely associates the transaction protocol data with the entity thereby consistently indicating to all peer systems of the DTRS that the entity is the originator of the data entry.

Because the encrypted data portion may be decrypted only by the security data that is public and available to any peer system within DTRS but is uniquely associated with the originating entity, the DTRS consistently and reliably identifies the requesting entity of the peer system that originated the data entry. Accordingly, decrypting the encrypted transaction proposal data by the public security data associated with the originating entity verifies that the originating entity has generated the transaction proposal data.

Continuing with the above example, the peer system of airline "XYZ" configures authorization protocol that is part of the write transaction to reflect airline "XYZ"'s data sharing policies. For example, if airline "XYZ" shares its generated data with the alliance that it is a member of, the authorization protocol reflects such sharing. Similarly, if there are entities, such as competitors of "XYZ" that are expressly forbidden from accessing the data of airline "XYZ," then the authorization protocol is configured to reflect such a restriction as well. In order for other peer systems in the DTRS to authenticate the transaction as being originated by airline "XYZ," the peer system of airline "XYZ" retrieves a private key of airline "XYZ" and encrypts at least a portion of the write request with the key. Other peers of the DTRS have access to the public key of the private key of airline "XYZ." Thus, when a peer system of a different entity successfully decrypts the portion with the public key, such decryption serves as authentication that the write request has indeed been generated by a peer system of airline "XYZ."

The DTRS may identify the data pools within the DTRS and the data provider systems associated with each of the data pools to send the transaction proposal data. In an embodiment, the transaction proposal is sent to the data provider systems for preparation. For example, each data provider may decrypt transaction protocol and execute the decrypted transaction proposal against its respective data pool, without committing the changes to the data pool. The commit may be performed only after the acknowledgments of the executions are propagated through the DTRS. The DTRS verifies that data provider systems of the DTRS has executed their respective transactions, and only then, in response to such verification, the DTRS causes the commit of the transactions on every data pool of the DTRS. The authorization protocol generated to enforce permission for new data entry is stored in data pools in association with the new data entry.

After the data entry is committed to the local data pool of another entity, a data consumer system of such entity does not need to request the data from a remote data provider or a third party managing aggregating data store. Because the authorization protocol data is also stored with the data entry in the local data pool of the non-originating entity, the access request of non-originating entity can be consistently and reliably authorized by the non-originating entity's data provider.

In an embodiment, the read transactions are recorded similarly to write transactions and propagated through the DTRS. Therefore, entities have access to the transaction records describing the read transactions of other entities and, if necessary, may audit read accesses to their own originated data entries by other entries. Such capability further improves the security of data access without compromising the speed of transfer.

Continuing with the above example, once the write transaction request for the search activity of "User A" on the web application of airline "XYZ" is committed throughout all the data pools of the DTRS, a peer system of any entity can request the data entry from the local data pool. Such a read request includes authorization protocol that may indicate all the credential of the requesting peer entity, such as its membership in alliances and its industry group (e.g., rental car, cruise travel, airline . . . ). However, whether such a request is satisfied by the requesting entity's own local data pool depends on whether the requesting entity is authorized to access the data entry based on the request's authorization protocol and the authorization protocol associated with the data entry. A peer system of airline "LMN" may request access to the data related to "User A" from its local data pool. The data entry originated from airline "XYZ" such as search activity with the destination city of "SFO" by "User A" may be returned if the airline "LMN"'s authorization protocol indicates membership in "XYZ" alliance. Otherwise, the request may be denied.

System Overview

FIG. 1 illustrates an example operating environment upon which an embodiment may be implemented. In FIG. 1, DTRS 100 may include one or more computer systems that are coupled using network 122 to one or more client systems 104-1 . . . N that perform user transactions that affect the data set(s) managed by the data pools of DTRS 100. Any number of client systems 104-1 . . . N may be deployed in a distributed computing system of this type, as indicated by the designation "N" in 104-1 . . . N.

Peer systems 180-1 . . . N are associated with respective entities and each of the systems contains the respective entity's copy of the data pool. For example, peer system 180-1 may be associated with a specific entity and may include data provider system 160, which hosts the entity's own copy of the data pool, data pool 172. Data pool 172 may be maintained as any type of data store such as a file repository, an SQL (Structured Query Language) database management system, a non-SQL database management system or any other database management system.

In an embodiment, client system 104-1 establishes a connection with an application system, such as application system 154, and performs a user transaction with server application 152. Such a user transaction may request data from data pool 172 to process the user transaction. Data provider system 160 may further authorize or deny authorization for data access requests initiated by application system 154 for data pool 172 of peer system 180-1.

Accordingly, data consumer application 156 invokes data integrity service 170 to request the data provider that is local to the entity, data provider system 160, to request data from data pool 172. Another user transaction from client system 104-1 may generate data, which is to be shared with entities of DTRS 100 according to the access policy. Accordingly, application system 154 requests data integrity service 170 to initiate a distributed transaction to update data pool 172 and other data pools of DTRS 100 with the data. Data provider systems of peer systems 180-1 . . . N may receive such transaction requests through network 122.

In an embodiment, a peer system further includes a data integrity service, such as data integrity service 170, which manages transactions for a respective peer system in DTRS 100. For example, data integrity service 170 generates transaction requests for preparing and committing transactions initiated by peer system 180, as well as verifies responses received for transaction requests. Other respective data integrity services of peer systems ensure that the consistency and freshness of data in data pools of DTRS 100 are maintained.

In an embodiment, a data integrity service of a peer system manages the security for the data generated by the application systems. For example, data integrity service 170 generates and overlays security protocols on top of transactions that are sent to data provider system 160 to enforce authorization.

In an embodiment, as part of a transaction processing in DTRS 100, ordering service system 190 generates data objects for data pools of DTRS 100 to store. Ordering service 192 generates blocks in a blockchain that may be ordered chronologically. The block(s)/block chain(s) are sent to data provider systems of peer systems 180-1 . . . N for data provider systems to update respective data pools.

For the purpose of explanation, FIG. 1 depicts application system 154 that includes server application 152 and data consumer application 156, data provider system 160 that includes data pool 172, and peer system 180-1 that includes data integrity service 170, application system 154 and data provider system 160. However, various embodiments may include these applications, services and a data pool hosted on different one or more computer, systems which do not necessarily adhere to the depiction in FIG. 1.

Furthermore, while FIG. 1 depicts network 122 communicatively coupling the components, other embodiments may include multiple interconnected networks. For example, each peer system may have its own internal network for interconnecting services and systems of the peer system. Similarly, peer systems 180-1 . . . N and ordering service system 190 of DTRS 100 may be connected using a different network than network 122 and/or the internal networks of peer systems. Network, such as network 122, broadly represents a digital data telecommunications network comprising a communications network, such as a local area network (LAN), a wireless LAN (WLAN), a storage area network (SAN), a wide area network (WAN), a wireless WAN (WWAN), a metropolitan area network (MAN), an ad hoc network, an intranet, an extranet, a virtual private network (VPN), a portion of the Internet, the Internet, a portion of a public switched telephone network (PSTN), a cellular network or a combination thereof.

Write Request

In an embodiment, a client system connects with an application system associated with a peer system of DTRS 100 and performs a client transaction that generates one or more client records for data pools of DTRS 100. For example, a user may use client application 108, such as a browser, on client system 104-1 to login into server application 152, web application, and perform a search, status check or purchase. Once data about the client transaction is collected, data consumer application 156 may arrange the data into one or more records to be provided to data integrity service 170 for updating data pool 172 and other data pools of DTRS 100.

Figure 2:
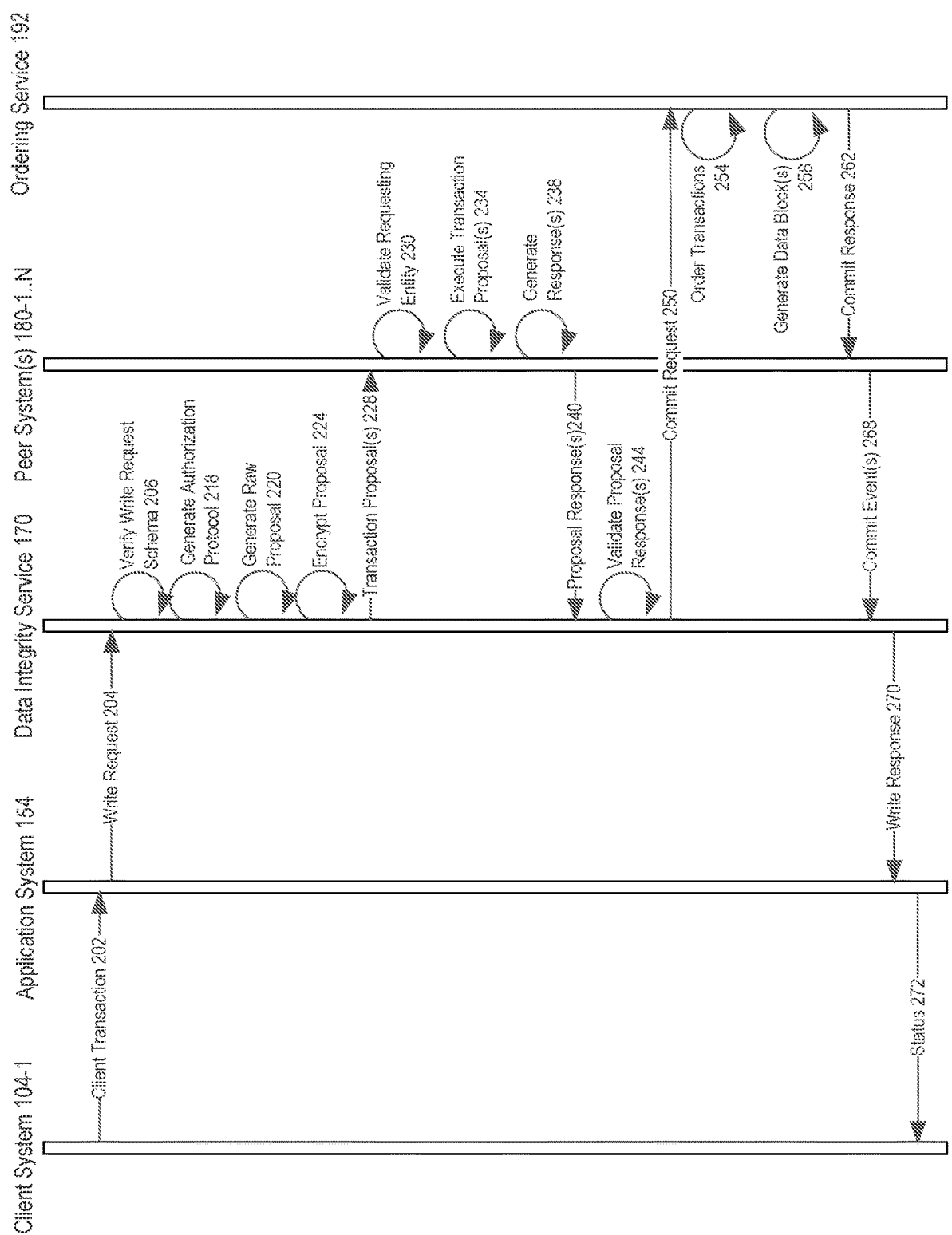
FIG. 2 is a sequence diagram that depicts steps for performing an update of record(s) to data pools of a DTRS, in an embodiment.

FIG. 2 is a sequence diagram that depicts steps for performing an update of record(s) to data pools of DTRS 100, in an embodiment. At step 202, client transaction is processed by application system 154 and a client write request record is generated at step 204 for data integrity service 170 to process.

In an embodiment, data integrity service 170 verifies the schema of the client write request, at step 206. For example, a client write request may necessarily contain a user identifier describing the user that initiated the client transaction but may only optionally contain a timestamp (e.g., the timestamp may be generated by data integrity service itself). The below sample client write request describe the user information in the form of the "UserId" key, indicates whether the request is a write request (as opposed to a read request) with the value of "W" for "Record Type" key. The request may further describe the nature of the client transaction providing information about the transaction processed by application system 154. In this example, "User A" has performed a flight search ("Search") for the San Francisco Airport ("SFO"). The transaction information may be described in one or more transaction key-value pairs.

UserId: User A
Record Type: W
Transaction Key: Search
Transaction Value: SFO
Timestamp: 2018-07-12

Continuing with FIG. 2, if at step 206, any required data to form a data pool record is missing, the client request is rejected, and a response is generated for application system 154.

Authorization Protocol

In an embodiment, data integrity service 170 proceeds to generate an authorization protocol at step 218. The term "authorization protocol" refers herein to data that describes access policy of associated record(s) by entities. The authorization protocol may describe which consumer entities can access, what type of access/operation is allowed on the record(s) (e.g., read, aggregation), and where such access can be allowed (e.g., geographic restrictions, market-based restrictions) among other possible restrictions. The authorization protocol is associated with the record(s) for which the protocol has been generated. The authorization protocol of the record is used to determine whether an entity is authorized to access the record.

In an embodiment, the determination of authorization is dependent on one or more of the following: a) the identity of the data consumer, b) the type of usage, c) the usage group that the entity of the data consumer, and d) the user, for which the record(s) are requested. Accordingly, the authorization protocol may describe one or more rule sets based on the above attributes to authorize a data consumer to access the associated record(s).

For example, the type of usage may define a rule set whether the data is authorized to be used by a web application or a mobile application, for analytics, for a scoring application or a data as a service application (DaaS). The authorization protocol may further describe a group-level rule set to authorize or to deny the authorization to any entity that is a member of a group, such as groups based on usage. As another example, the authorization protocol may describe an entity-level rule set to authorize or to deny the authorization to a particular entity.

In an embodiment, the authorization protocol includes an activity-based rule set. The data integrity service may set authorization(s) of record(s) in the authorization protocol authorizing and/or denying access to the record based on intended activity by a requesting data consumer. The activity type may define a rule set with a description of activity that is authorized to be performed using the data: e.g., generating a search result that includes the data, performing a particular transaction based on the data (booking, visit, loyalty, upgrade for the travel industry entities), or updating an existing transaction.

Additionally or alternatively, a data integrity service may define rule sets for record(s) in the authorization protocol authorizing and/or denying access to the record based on the identity of a requesting data consumer and/or membership of the associated entity in a group.

In an embodiment, a data integrity service appends the authorization protocol to the write request as a new set of key-value pair(s). The sample authorization protocol below includes a) the "Restrictions" key-value pair, which is an array of exception strings that indicates that the authorization should be denied to data consumers that are identified by any of those strings, and b) the "Approval" key-value pair, which is a bitmap, in which each set bit represents a particular group of entities that is authorized to access and each clear bit represents a particular group of entities that is denied the authorization to access. For example, the first bit in the Approval's key-value pair may represent authorization for the "XYZ" industry group of airlines, the fourth set bit may represent authorization for rental industry group members, and the eights set bit may represent authorization for the "XYZ" airline entity. Thus, if the requesting entity for this record is an airline (using for airline registration) that is a member of the "XYZ" group, the data consumer associated with the entity would be authorized to request this data.

Restrictions: none
Approvals: 1001000100000

Other techniques for associating the authorization protocol with the record(s) in the write request may include using third-party security services (e.g., LDAP, Active Directory).

Transaction Proposal

Continuing with the embodiment depicted in FIG. 2, at step 220, transaction proposal data is generated, in an embodiment. To generate a transaction proposal, data integrity service 170 may generate a transaction identifier to uniquely identify the transaction within DTRS 100. The transaction identifier may be a GUID (Globally Unique Identifier) or any other unique identifier. The transaction identifier is associated with the transaction, for example, by appending a new transaction key-value pair, "Transaction Key Id" to the transaction information and thereby generating a transaction proposal. The transaction proposal includes authorization information also, as an example, appended to the other transaction key-value pair strings as authorization key-value pairs for the record(s) of the transaction.

Continuing with the above example of transaction key-value pairs, the full list of key-value pairs after step 220 may include the following.

Transaction Key Id: 123
Usage Type: all
Activity Type: Search
Activity Group: Airline
Restrictions: none
Approvals: 1001000100000

Validating Identity

In an embodiment, a peer system is associated with private security data that uniquely represents the associated entity. The private security data is stored as a secret, only accessible to the peer system(s) of the entity. No other entity may access the private security data and impersonate the associated entity. An example of private security data may be a private key managed by a key management service or by a trusted platform module.

At least a portion of a transaction protocol may be encrypted using the private security data thereby generating encrypted transaction protocol, in an embodiment. Such encryption generates a unique signature of an entity tied to the transaction proposal. Only the security data (public or private) that is uniquely associated with the entity can decrypt the encrypted the transaction proposal. Thus, if a system associated with another entity decrypts the encrypted transaction proposal using the security data uniquely associated with the entity, the other entity authenticates and identifies that the transaction proposal has originated from a peer system associated with the entity.

Public Key Infrastructure (PKI) is an example of public/private security data generation framework that allows both public and private security data to be uniquely associated with the entity. Thus, if a different system is successful in decrypting an encrypted transaction proposal using the public key of a particular entity, then it is determined that the transaction protocol has been generated by a peer system associated with the particular entity.

Continuing with FIG. 2, at step 224, the transaction proposal generated by data integrity service 170 may be fully or partially encrypted by the private key of the entity associated with the service. In the embodiment in which the whole transaction proposal is encrypted, the encrypted transaction protocol is sent at step 228. In the embodiment in which the transaction proposal is partially encrypted, the signature is attached to the unencrypted transaction proposal thereby generating partially encrypted transaction proposal to be sent at step 228.

At step 228, the encrypted transaction protocol is sent to peer systems 180-1 . . . N for processing. Each of peer systems 180-1 . . . N, upon the receipt of the encrypted transaction protocol, retrieves the public security data associated with the entity of data integrity service. A peer system may identify originating entity based on metadata of the request or from any unencrypted portion of transaction protocol. Once identified, the peer system may retrieve the public key associated with the entity and decrypt whole or in part the transaction protocol.

If at step 230, the peer system uses the originating entity's public security data to successfully decrypt at least a portion of the received encrypted transaction proposal, the successful decryption validates that the transaction proposal was sent by the originating entity.

Preparing Transaction for Distributed Data Pools

At step 234, once validated, each peer system that received the transaction proposal prepares its respective data pool for being updated with the record of the transaction proposal. For example, a peer system may execute the decrypted transaction proposal against the current state of the data pool, but nothing is written in a transaction record for the data pool.

At step 238, each of peer systems 180-1 . . . N that prepared the received transaction proposal generates a response based on the success (or failure) of the preparation, in an embodiment. In another embodiment, no response is generated, if the preparation has failed.

The processing peer system may generate a random transaction identifier that uniquely represents the successful change of the data pool state due to the preparation of the transaction for the data pool. In an embodiment, each of peer systems 180-1 . . . N encrypts (at least partially) the corresponding response using its private security data of the entity associated with the processing peer system. At step 240, peer systems 180-1 . . . N send their responses (if any) to the originating data integrity service 170.

Data integrity service 170 receives responses for the requested transaction proposal from peer systems 180-1 . . . N of DTRS 100. Based on the responses (or lack thereof), data integrity service 170 determines whether the transaction proposal is to be committed such that the record is updated in the data pools of peer systems 180-1 . . . N at step 244.

Because all the peer systems have to indicate to data integrity service 170 with a response (or lack thereof) whether the transaction proposal has been successfully prepared, data integrity service 170 can maintain the integrity of the data pools of all peer systems 180-1 . . . N in DTRS 100. If each and every peer system maintaining a data pool returns that the transaction proposal has been successfully prepared, then a successful commit request would guarantee that all instances of data pool in DTRS 100 are all updated with the record(s) in the transaction proposal.

In an embodiment in which the responses from peer systems 180-1 . . . N are at least partially encrypted, data integrity service 170 uses for decryption the public security data, such as the public key, of the corresponding entity of the peer system that has sent the response. The decryption of the response by data integrity service 170 represents that the responding system indeed represents the entity and thus, the entity's data pool is ready to be updated with the record. Such an identification improves the security of the record updates within DTRS 100, even when DTRS 100 is spread out throughout the Internet. The identification further provides an additional methodology to verify which exact peer system(s) have successfully prepared and which ones have failed.

In an embodiment, if no response is received or failure response is received from a peer system of DTRS 100, then the transaction proposal may be resent and the steps 228-240 re-performed again by data integrity service 170 to validate. Alternatively, the transaction proposal may be canceled by data integrity service 170 with an appropriate notification sent out to peer systems 180-1 . . . N if necessary.

Committing Transaction for Distributed Data Pools

Upon receiving successful preparation responses from all the destination peer systems, data integrity service 170 requests the transaction to be committed by peer systems 180-1 . . . N. The commit persistently updates data pools with the record(s) of the transaction proposal. A response may be generated to the application system 154 and/or client system 104-1.

In an embodiment, the data pools of DTRS 100 arrange records in a blockchain. To append to the existing blockchain stored in a data pool, a new set of blocks is generated in the pre-determined ordered and is sent to all data pools for an update. Using blockchain techniques to update data pools ensures linear immutability of the data within the data pools of DTRS 100.

Continuing with FIG. 2, at step 250, data integrity service 170 sends a commit request for the transaction proposal to ordering service 192. In addition to the transaction protocol, the request may include the responses to the preparation of the transaction from peer systems 180-1 . . . N, and signature data. At step 254, ordering service 192 orders the received data in a predetermined manner (e.g., chronologically) and generates a set of data blocks, blockchain, at step 258. The blockchain is sent to peer systems 180-1 . . . N and is appended to the data pool at step 262. The state in the data pools of DTRS 100 is changed to indicate that the transaction has been committed. The commit event for the committal event is sent to data integrity service 170 at step 268. Completing the write transaction, data integrity service 170 may notify application system 154 that its originated write request has been completed at step 270. Application system 154 may, in turn, notify client system 104-1 that the write request has been successfully processed at step 272.

Read Request

Additionally or alternatively, a client transaction with an application system associated with a peer system of DTRS 100 may generate a read request for a data pool of DTRS 100. For example, a user may use a browser on client system 104-1 to login into data consumer application 156, web application, and perform a search, status check or purchase. Based on the user identifier of the user data consumer application 156 may be configured to assess what type of products should the user be offered for purchase. Such an assessment would entail analyzing data about the user represented by the user ID.

Using techniques described herein to collect data about user ID, data consumer application 156 has no need to remotely request the data from other entities or a central data pool, incurring lag due to network transmission and remote processing. Rather, data consumer application 156 invokes data integrity service 170 to request a read of all data associated with the same user identifier from local data pool 172 of DTRS 100, significantly improving the performance of data consumer application 156.

Figure 3:
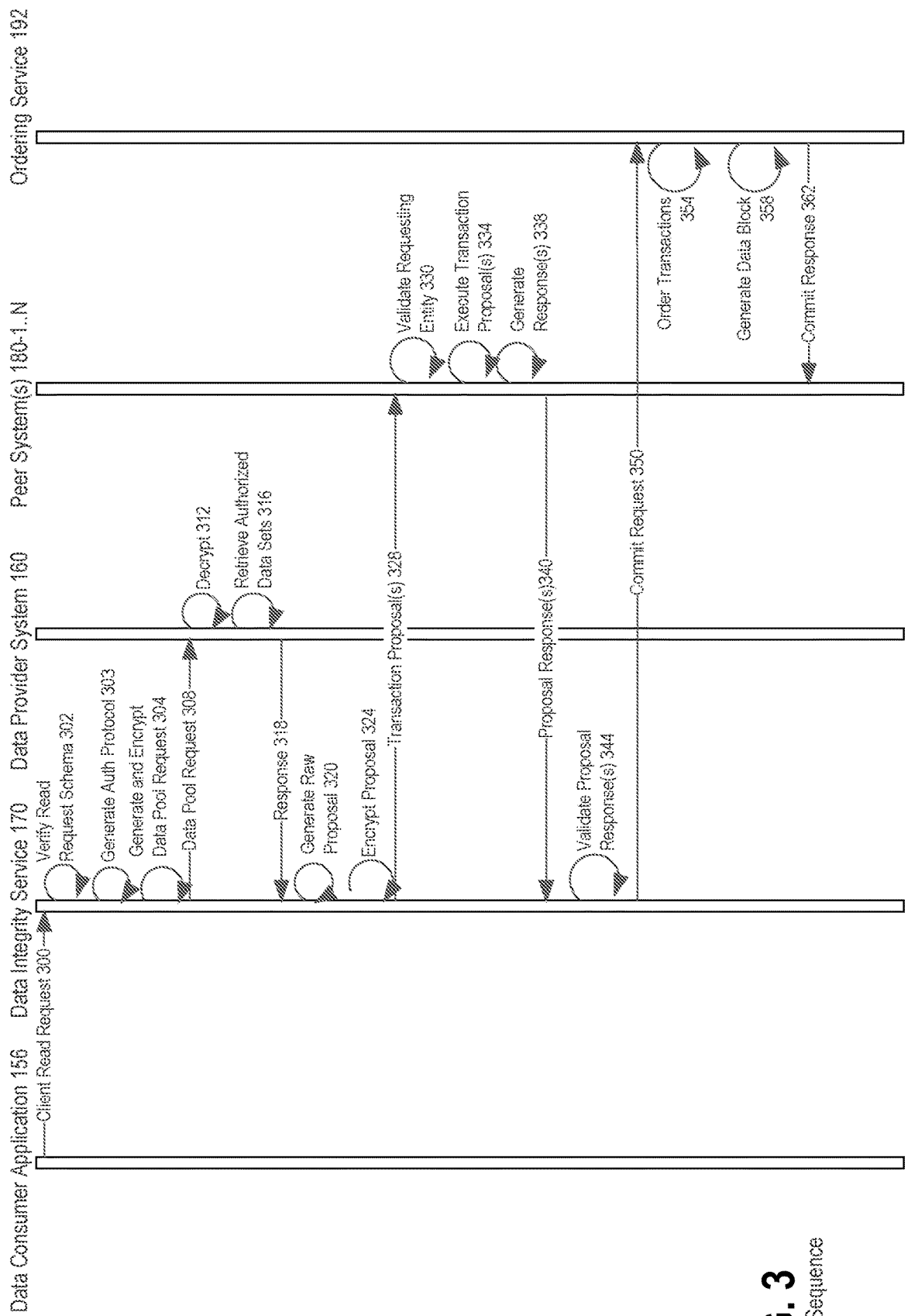
FIG. 3 is a sequence diagram that depicts steps for performing a read request for record(s) from a local data pool of a DTRS, in an embodiment.

FIG. 3 is a sequence diagram that depicts steps for performing a read request for record(s) from local data pool 172 of DTRS 100, in an embodiment. At step 300, a client read request record is generated for data integrity service 170 to process.

In an embodiment, data integrity service 170 verifies the schema of the client read request, at step 302. For example, a client read request may necessarily contain a user identifier that is associated with the requested data but may only optionally contain a timestamp (e.g., the timestamp may be generated by data integrity service 170, itself). The below sample client read request describe the user information in the form of the "UserId" key, indicates that the request is a read request (as opposed to a write request) with the value of "R" for "Record Type" key.

UserId: User A
Record Type: R
Timestamp: 2018-07-12

Continuing with FIG. 3, if at step 302, any required data to form a data pool record is missing, the client request is rejected, and a response is generated for application system 154.

Determining Authorization

In an embodiment, data integrity service 170 proceeds to generate an authorization protocol at step 303. In an embodiment, the authorization protocol includes one or more of: a) the identity of the data consumer, b) the type of usage, c) the usage group that the entity of the data consumer, and d) the user, for which the record(s) are requested, and d) the activity to be performed on the requested data. For example, the type of usage may include whether the requested data is going to be used by a web application or a mobile application, for analytics, for a scoring application or a data as a service application (DaaS). The activity type may include the description of the activity that is going to be performed using the requested data such as generating a search result, performing a purchase transaction such as booking, visit, loyalty, upgrade for the travel industry entities, or updating an existing transaction.

In an embodiment, data integrity service 170 appends the authorization protocol to the read request as a new set of key-value pair(s). The sample authorization protocol below includes a) the "Usage Type" key-value pair, which is an array of strings describing type of the requested usage, and b) the "Usage Group" key-value pair, which is an array of strings describing the groups that the entity is a member of and thus may access and use the data of the other entities in the group.

Usage Type: web|site
Usage Group: booking

At step 304, data integrity service 170 generates a data pool request by appending the authorization protocol to the client read request key-value pair(s).

To unequivocally represent that the data pool request has been originated by data consumer application 156 of the entity, data integrity service 170 encrypts at least a portion of the request using the private security data associated with the entity. The private security data may be a private key generated for the entity as part of the PKI. The private security data may be uniquely cryptographically associated with public security data, such as public key, such that data encrypted by the private security data can be only decrypted by the public security data. At step 308, data integrity service 170 sends the encrypted data pool request to data provider system 160.

At step 312, data provider system 160 decrypts received data pool request based on public security data associated with the entity, thereby validating that the data pool request received has originated from a system associated with the entity.

At step 316, data provider system 160 proceeds to authorize the received data pool request and to retrieve the authorized data sets.

Figure 4:
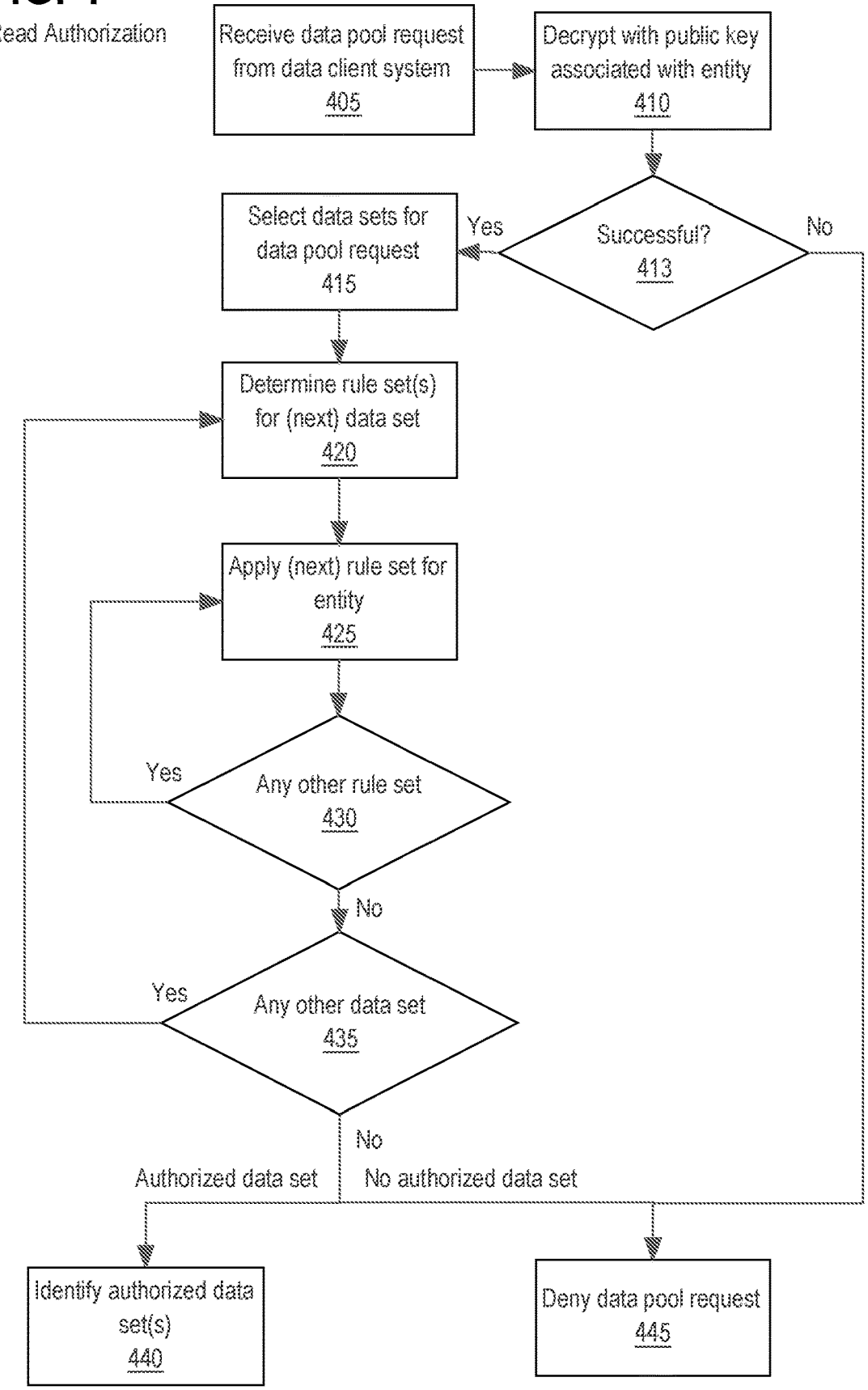
FIG. 4 is a flowchart that depicts a process for authorization of a data pool request, in an embodiment.

FIG. 4 is a flowchart that depicts a process for authorization of a data pool request, in an embodiment. At step 405, a data pool managing system, such as data provider system 160 for data pool 172, receives a read request for specified data of the data pool to perform an activity on the data.

At step 410 (similar to step 312 of FIG. 3), data provider system 160 decrypts received data pool request based on public security data associated with the entity, thereby validating that the data pool request received has originated from a system associated with the entity. If the decryption is unsuccessful at step 413, then the process returns no authorized data set at step 445 and a failure response may be generated.

If at step 413, the decryption is successful, data provider system 160 parses the data pool request to identify the criteria for selection of the requested data. In addition to the information on activity to be performed, the request may contain criteria for selection of data for the activity such as a type of data requested, the user ID for which data is to be selected, the creation date-range of data and/or value-range for specific columns (or other data objects) of data. In an embodiment, data selection criteria are described in the form of a query statement such as an SQL statement or JSON matrix. As a non-limiting example of a request, the below key-value pairs represent data selection criteria for the request, which request data to be selected that is associated with the user ID "User A" for performing any activity by a web application or a site application for an entity that belongs to the "booking" group of entities.

UserId: User A
Activity: All
Usage Type: web|site
Usage Group: booking

At step 415, data provider system 160 determines which data set(s) of data pool 172 contain data for the requested activity. In an embodiment in which a query is specified in the request, data provider system 160 may process the query against the data pool to identify the possible data sets for the requested data. In other embodiments, data provider system 160 is pre-configured to associate the request to one or more data sets in the data pool that contain the requested data.

At steps 420 through 435, data provider system 160 iterates through the identified one or more data sets and applies the respective one or more rule set(s) associated with each of the identified data sets. In an embodiment, the authorization protocol of one or more records of the data set defines a rule set of the data set.

At step 420, data provider system 160 iterates through the data sets identified at step 415. At step 425, data provider system 160 determines one or more rule sets associated with the data set selected at step 420 and applies each rule set for the selected data set. Data provider system 160 may iterate through the authorization protocols of the record(s) within the data set and determine the one or more rule sets to be applied for the data sets.

At steps 425-430, each rule set of the one or more rule sets of a selected data set is applied, and the application of the rule sets resolves whether the selected data set qualifies as an authorized data set for the requesting entity.

In an embodiment, in which multiple rule sets are associated with a selected data set, if at least one rule set qualifies the data set as authorized data set for the requesting entity, then the data set is authorized to be used for the requested activity. In another embodiment, if at least one rule set disqualifies the data set as an authorized data set for the requesting entity, then the data set cannot be used for the requested activity by the requested entity.

The rule sets associated with the selected data set may also be preconfigured according to a hierarchy. In such an embodiment, a rule set may be selected at step 425 based on the hierarchy. In one embodiment, a disqualification or qualification based on a lower-tiered rule set overrides an application of a higher-tiered rule set. In such an embodiment, the lower-tiered rule set may be applied first. In another embodiment, a disqualification or qualification based on a higher-tiered rule set overrides a lower-tiered rule set for a data set. In such an embodiment, the higher-tiered rule set may be applied first. In either of the hierarchy-based rule set applications, if a rule set neither qualifies nor disqualifies a data set, the next rule set in the hierarchy is used to determine the qualification of the data set as an authorized data set for the requesting entity.

In case that none of the rule set(s) neither qualifies nor disqualifies the data set, then a preconfigured default rule set may be used to determine the qualification. For example, the default rule set may be to qualify a data set as authorized data set, if all the associated rule set(s) neither qualified nor disqualified the data set as such.

Rule set resolution to qualify or disqualify a data set may be based on comparing the content of the rule set with the data of the request. In an embodiment, a rule set describes criteria that an entity associated with the request has to meet in order to be qualified or disqualified from using the associated data set. Criteria of rule set may describe the verticals of industry that a requesting entity has to be part of, a geography in which a requesting entity has to operate, an organization of which a requesting entity has to be a member, and/or a list of entities of which a requesting entity has to be part of.

Additionally or alternatively, criteria of a rule set may specify authorized or unauthorized activity types on the associated data set(s) of the rule set. Criteria may explicitly permit a requested activity on the associated data set(s) if the requested activity matches the authorized activity type or at least fails to match any of the specified unauthorized activity. Otherwise, the application of the rule set with such criteria may fail to qualify the associated data set(s) as authorized for the requesting entity.

Continuing with the above example record for user ID "User A" may have the following authorization protocol associated with it, as described above.

Usage Type: all
Restrictions: none
Approvals: 1001000100000

This authorization protocol translates into a rule set for the record. The generated rule set authorizes the record to be used for any activity based on the Usage Type key-value, with no entity to be absolutely denied authorization based on the Restriction key-value, and authorizing entities that are member of the entity groups specified by the bitmap (e.g., "XYZ" airline group of entities, rental industry entities, and airline "XYZ" entity). The generated rule set based on the authorization protocol is applied to the data pool request to determine whether the record is returned to data integrity service 170 as part of the result set.

Based on the decryption, the validated entity is compared with the Restriction key-value to determine whether the entity is restricted out/denied authorization for the record. Since no restriction exists, the next rule about authorized activities is applied. The request specifies the "Activity" key having the value of "all" and the corresponding rule, which is based on the "Usage Type" key-value, also allows any activity on the record. Thus, the activity-based rule also authorizes the usage of the record.

However, the validated entity is a member of "booking" entity group which is not any of the authorized groups in the rule based on the "Approvals" key-value. Thus, this rule denies the authorization for the record. Although in this example, the rule set associated with one selected record may deny authorization, another selected record's rule set may grant the authorization for the other record. In such an example, only the authorized record is returned without the record for which the authorization was denied.

In one embodiment, the system determines based on one rule set, that a data set does not qualify as an authorized data set for the activity. At the same time, based on another rule set of the same level, data provider system 160 determines that the same data set does qualify as an authorized data set for the entity. If no other tier rule set exists for the data set, according to one approach, data provider system 160 determines that the authorizing rule set overrules the non-authorizing rule set, and may proceed to fulfil the request for performing the activity using the data set. According to another approach, data provider system 160 determines that the non-authorizing rule set overrules the authorizing rule set and exclude the data set from being used in the requested activity.

In another embodiment, the system may determine the authorized data based on designated access of a system-level rule set without applying any other rule set. The system determines whether any system-level rule set is associated with a requesting entity. If a system-level rule set is associated with the requesting entity and designates access to the requesting entity for one or more data sets, then the data sets are qualified as authorized data for the requesting entity without applying any other rule set including those associated with the data sets. Similarly, if the associated system-level rule set designates the requesting entity and denies access to the requesting entity, then the requesting entity is denied access without applying any other rule set.

Continuing with FIG. 4, steps 420-435 are performed for all data sets that match the request. The authorized data sets for the requested activity are identified at step 440. If no authorized data set has been identified for the request, the requested activity is denied at step 445.

Further techniques of rule set based authorization are described in "RULE SET-BASED AUTHORIZATION FOR DATA POOL," application. Ser. No. 16/001,913, filed on Jun. 6, 2018, the entire contents of which are hereby incorporated by reference.

Transaction for Logging Read Request

Continuing with the embodiment depicted in FIG. 3, at step 320, transaction proposal data is generated to log the data pool read request, in an embodiment. The transaction proposal may be generated only if the data pool request has caused for a result to be returned by data provider system 160 at step 318, otherwise an error is returned to the originating system.

To generate a transaction proposal, data integrity service 170 may generate a transaction identifier to uniquely identify the transaction within DTRS 100. The transaction identifier may be a GUID (Globally Unique Identifier) or any other unique identifier. The transaction identifier is associated with the transaction, for example, by appending a new transaction key-value pair, "Transaction Key Id" to the transaction information and thereby generating a transaction proposal.

Continuing with the above example of transaction key-value pairs, the full list of key-value pairs after step 320 may include the following.

Transaction Key Id: 123
UserID: User A
Transaction Key:
Transaction Value:
Timestamp:

At step 324, the transaction proposal generated by data integrity service 170 may be fully or partially encrypted by the private key of the entity associated with the service. In the embodiment in which the whole transaction proposal is encrypted, the encrypted transaction protocol is sent at step 328. In the embodiment in which the transaction proposal is partially encrypted, the signature is attached to the unencrypted transaction proposal thereby generating partially encrypted transaction proposal to be sent at step 328.

At step 328, the encrypted transaction protocol is sent to peer systems 180-1 . . . N for processing. Each of peer systems 180-1 . . . N, upon the receipt of the encrypted transaction protocol, retrieves the public security data associated with the entity of data integrity service. A peer system may identify originating entity based on metadata of the request or from any unencrypted portion of transaction protocol. Once identified, the peer system may retrieve the public key associated with the entity and decrypt whole or in part the transaction protocol.

If at step 330, the peer system uses the originating entity's public security data to successfully decrypt at least a portion of the received encrypted transaction proposal, the successful decryption validates that the transaction proposal was sent by the originating entity.

At step 334, once validated, each peer system that received the transaction proposal prepares its respective data pool for being updated with the log record of the transaction proposal. For example, a peer system may execute the decrypted transaction proposal against the current state of the data pool, but nothing is written in a transaction record for the data pool.

At step 338, each of peer systems 180-1 . . . N that prepared the received transaction proposal generates a response based on the success (or failure) of the preparation, in an embodiment. In another embodiment, no response is generated, if the preparation has failed.

The processing peer system may generate a random transaction identifier that uniquely represents the successful change of the data pool state due to the preparation of the transaction for the data pool. In an embodiment, each of peer systems 180-1 . . . N encrypts (at least partially) the corresponding response using its private security data of the entity associated with the processing peer system. At step 340, peer systems 180-1 . . . N send their responses (if any) to the originating data integrity service 170.

Data integrity service 170 receives responses for the requested transaction proposal from peer systems 180-1 . . . N of DTRS 100. Based on the responses (or lack thereof), data integrity service 170 determines whether the transaction proposal is to be committed such that the log record is updated in the data pools of peer systems 180-1 . . . N, at step 344.

Because all the peer systems have to indicate to data integrity service 170 with a response (or lack thereof) whether the transaction proposal has been successfully prepared, data integrity service 170 maintains the integrity of the data pools of all peer systems 180-1 . . . N in DTRS 100. If each and every peer system maintaining a data pool returns that the transaction proposal has been successfully prepared, then a successful commit request guarantees that all instances of data pool in DTRS 100 are all updated with the log record(s) in the transaction proposal.

In an embodiment in which the responses from peer systems 180-1 . . . N are at least partially encrypted, data integrity service 170 uses for decryption the public security data, such as the public key, of the corresponding entity of the peer system that has sent the response. The decryption of the response by data integrity service 170 represents that the responding system indeed represents the entity and thus, an entity's data pool is ready to be updated with the log record. Such an identification improves the security of the log record updates within DTRS 100, even when DTRS 100 is spread out throughout the Internet. The identification further provides an additional methodology to verify which exact peer system(s) have successfully prepared and which ones have failed.

In an embodiment, if no response is received or failure response is received from a peer system of DTRS 100, then the transaction proposal may be resent and the steps 328-340 re-performed again by data integrity service 170 to validate. Alternatively, the transaction proposal may be canceled by data integrity service 170 with an appropriate notification sent out to peer systems 180-1 . . . N if necessary.

Upon receiving successful preparation responses from all the destination peer systems, data integrity service 170 requests the transaction to be committed by peer systems 180-1 . . . N. The commit persistently updates data pools with the record(s) of the transaction proposal. A response may be generated to the application system 154 and/or client system 104-1.

In an embodiment, the data pools of DTRS 100 arrange records in a blockchain. To append to the existing blockchain stored in a data pool, a new set of blocks is generated in the pre-determined ordered and is sent to all data pools for an update. Using blockchain techniques to update data pools ensures linear immutability of the data within the data pools of DTRS 100.

Continuing with FIG. 3, at step 350, data integrity service 170 sends a commit request for the transaction proposal to ordering service 192. In addition to the transaction protocol, the request may include the responses to the preparation of the transaction from peer systems 180-1 . . . N, and signature data. Ordering service 192 orders the received data in a predetermined manner (e.g., chronologically) at step 354 and generated a set of data blocks, blockchain, at step 358. The blockchain is sent to peer systems 180-1 . . . N and is appended to the data pool at step 362. The state in the data pools of DTRS 100 is changed to indicate that the transaction has been committed.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
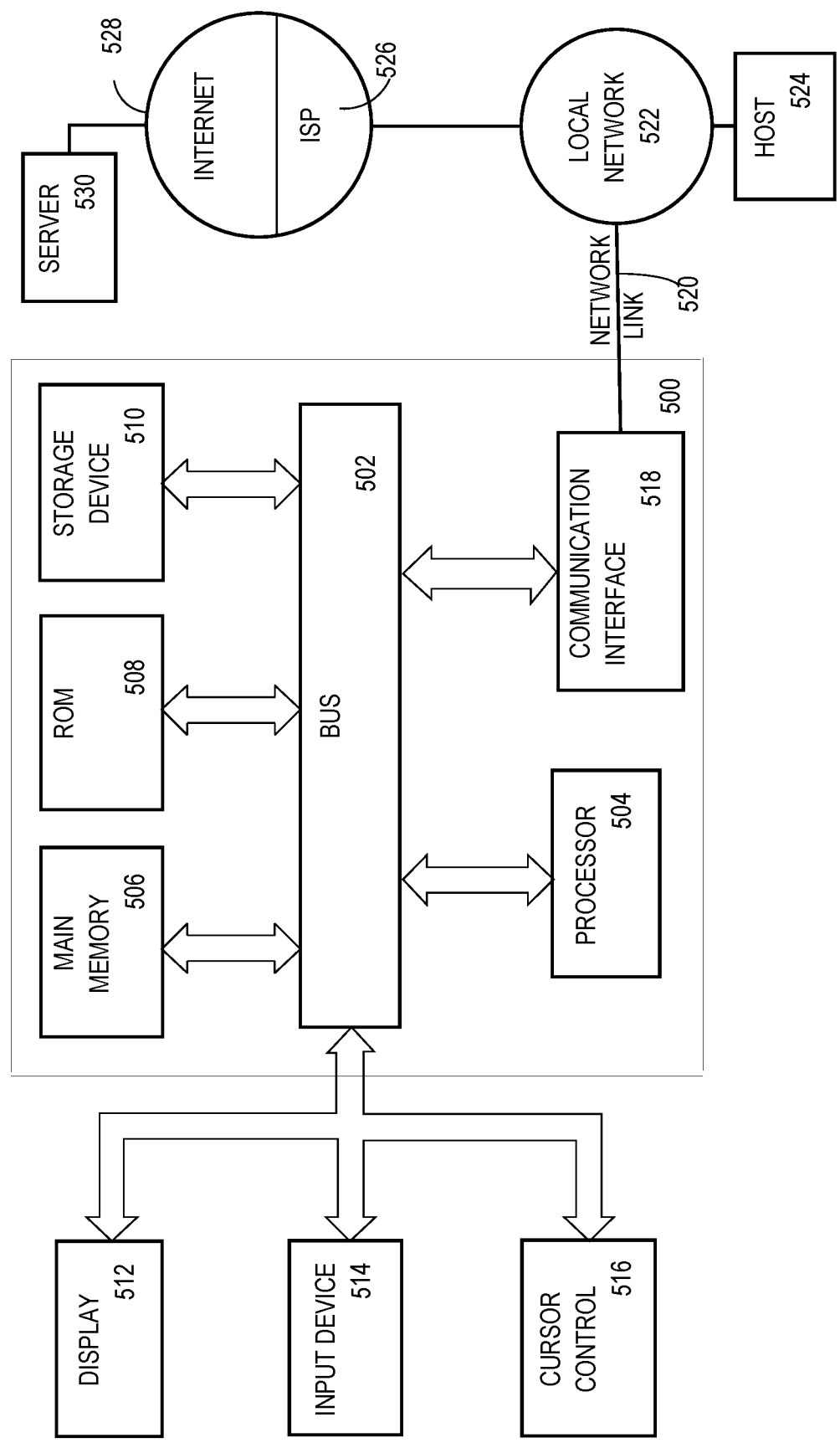
FIG. 5 is a block diagram that illustrates a computer system upon which an embodiment of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal, and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526, in turn, provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Software System Overview

Figure 6:
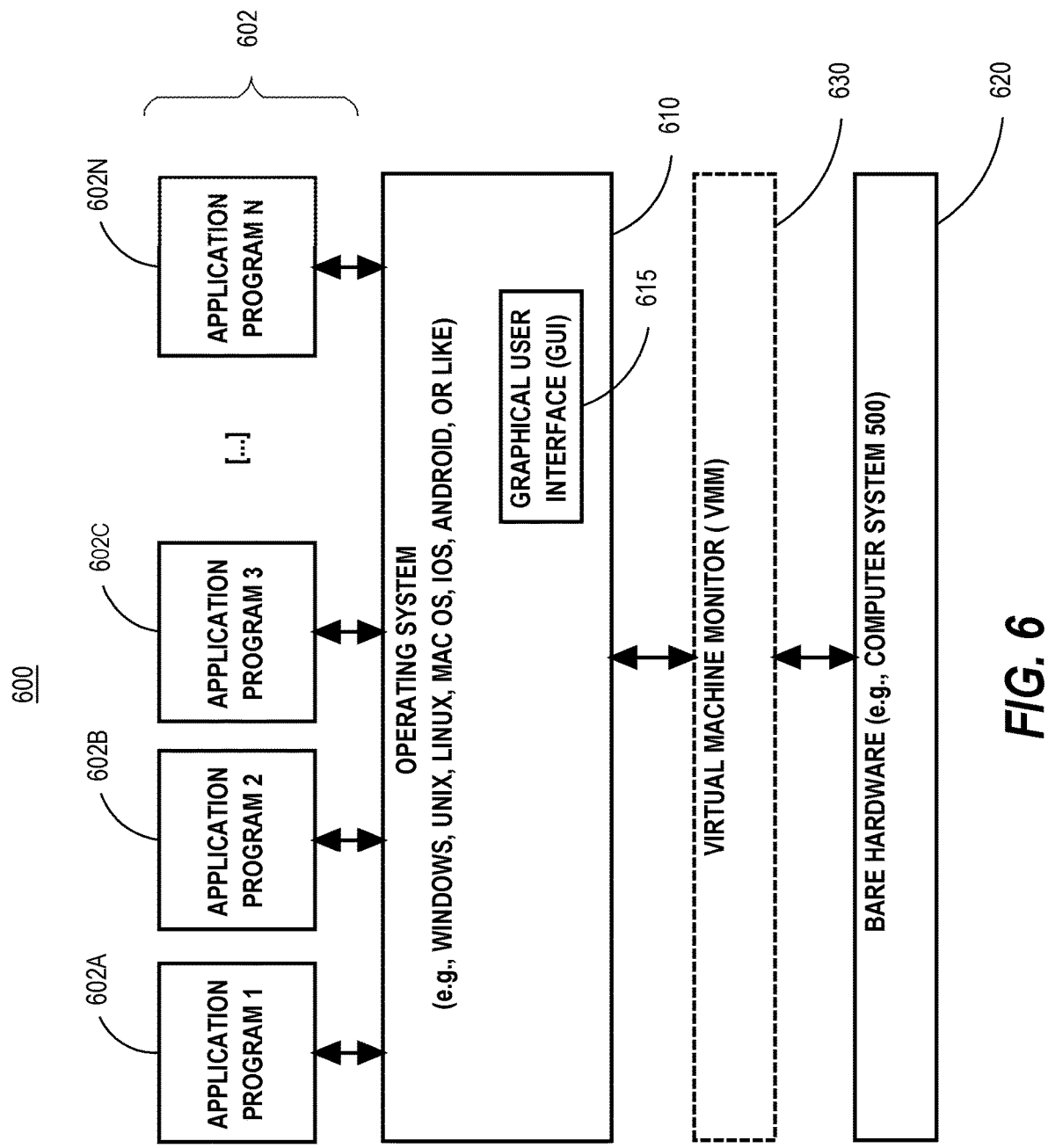
FIG. 6 is a block diagram of a basic software system, in one or more embodiments.

FIG. 6 is a block diagram of a basic software system 600 that may be employed for controlling the operation of computing system 500 of FIG. 5. Software system 600 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 600 is provided for directing the operation of computing system 500. Software system 600, which may be stored in system memory (RAM) 506 and on fixed storage (e.g., hard disk or flash memory) 510, includes a kernel or operating system (OS) 610.

The OS 610 manages low-level aspects of computer operation, including managing execution of processes, memory allocation, file input and output (I/O), and device I/O. One or more application programs, represented as 602A, 602B, 602C . . . 602N, may be "loaded" (e.g., transferred from fixed storage 510 into memory 506) for execution by the system 600. The applications or other software intended for use on computer system 500 may also be stored as a set of downloadable computer-executable instructions, for example, for downloading and installation from an Internet location (e.g., a Web server, an app store, or another online service).

Software system 600 includes a graphical user interface (GUI) 615, for receiving user commands and data in a graphical (e.g., "point-and-click" or "touch gesture") fashion. These inputs, in turn, may be acted upon by the system 600 in accordance with instructions from operating system 610 and/or application(s) 602. The GUI 615 also serves to display the results of operation from the OS 610 and application(s) 602, whereupon the user may supply additional inputs or terminate the session (e.g., log off).

OS 610 can execute directly on the bare hardware 620 (e.g., processor(s) 504) of computer system 500. Alternatively, a hypervisor or virtual machine monitor (VMM) 630 may be interposed between the bare hardware 620 and the OS 610. In this configuration, VMM 630 acts as a software "cushion" or virtualization layer between the OS 610 and the bare hardware 620 of the computer system 500.

VMM 630 instantiates and runs one or more virtual machine instances ("guest machines"). Each guest machine comprises a "guest" operating system, such as OS 610, and one or more applications, such as application(s) 602, designed to execute on the guest operating system. The VMM 630 presents the guest operating systems with a virtual operating platform and manages the execution of the guest operating systems.

In some instances, the VMM 630 may allow a guest operating system to run as if it is running on the bare hardware 620 of computer system 500 directly. In these instances, the same version of the guest operating system configured to execute on the bare hardware 620 directly may also execute on VMM 630 without modification or reconfiguration. In other words, VMM 630 may provide full hardware and CPU virtualization to a guest operating system in some instances.

In other instances, a guest operating system may be specially designed or configured to execute on VMM 630 for efficiency. In these instances, the guest operating system is "aware" that it executes on a virtual machine monitor. In other words, VMM 630 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system and may run under the control of other programs being executed on the computer system.

Multiple threads may run within a process. Each thread also comprises an allotment of hardware processing time but share access to the memory allotted to the process. The memory is used to store the content of processors between the allotments when the thread is not running. The term thread may also be used to refer to a computer system process in multiple threads are not running.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers. In a cloud computing environment, there is no insight into the application or the application data. For a disconnection-requiring planned operation, with techniques discussed herein, it is possible to release and then to later rebalance sessions with no disruption to applications.

The above-described basic computer hardware and software and cloud computing environment presented for the purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

What is claimed is:

1. A computer-implemented method comprising:
    receiving a write request to store a data entry associated with an originating entity, of a plurality of entities, into a data pool of the plurality of entities;
    wherein each of a plurality of instances of the data pool are stored on a corresponding data provider system of a plurality of data provider systems, each of the plurality of data provider systems associated with a different entity of the plurality of entities;
    based at least in part on the write request, generating transaction data for the write request to store the data entry, the transaction data at least in part defining one or more rule sets for accessing the data entry;
    wherein the one or more rule sets specify one or more conditions that must be satisfied by a read request before the read request is authorized to access the data entry;
    sending, to the plurality of data provider systems, the transaction data, thereby causing storing the data entry in the plurality of instances of the data pool;
    wherein sending, to the plurality of data provider systems, the transaction data further causes storing permission data describing the one or more rule sets for accessing the data entry in association with the data entry.

2. The method of claim 1, wherein the transaction data includes a digital signature associated with the originating entity.

3. The method of claim 1, wherein a recipient instance of the data pool stores a chain of data blocks, and the method further comprising generating a new data block in the chain of data blocks of the data pool, the new data block comprising the data entry and permission data describing the one or more rule sets for accessing the data entry.

4. The method of claim 1, further comprising:
    receiving a response from a recipient data provider system, of the plurality of data provider systems, associated with a recipient entity, the recipient data provider system hosting a recipient instance of the data pool;
    wherein the response acknowledges that the recipient data provider system has successfully prepared the recipient instance of the data pool for update with the data entry.

5. The method of claim 4, wherein the response includes a digital signature associated with the recipient entity.

6. The method of claim 4, further comprising generating a request to commit the update of the data entry on the recipient data provider system, wherein the commit request causes committing of the update on the recipient instance of the data pool.

7. The method of claim 1 further comprising:
    receiving a plurality of responses from the plurality of data provider systems;
    wherein each of the plurality of responses comprises a different transaction identifiers for each of the plurality of entities;
    storing the different transaction identifiers in association with the data entry.

8. The method of claim 1 further comprising:
    receiving a plurality of responses from the plurality of data provider systems;
    based on the plurality of responses, determining that a first data provider system of the plurality of data provider systems has successfully prepared a first instance of the data pool, on the first data provider system, for update with the data entry, while a second data provider system of the plurality of data provider systems has failed to successfully prepared a second instance of the data pool, on the second data provider system, for update with the data entry;
    based on the determining, canceling the write request to store the data entry into the plurality of instances of the data pool.

9. The method of claim 1 further comprising:
    receiving a plurality of responses from the plurality of data provider systems;
    based on the plurality of responses, determining that a first data provider system of the plurality data provider systems has successfully prepared a first instances of the data pool, on the first data provider system, for update with the data entry, and a second data provider system of the plurality of data provider systems has failed to successfully prepare a second instance of the data pool, on the second data provider system, for update with the data entry;

based on determining that the second data provider system has failed to successfully prepare the second instance of the data pool for update with the data entry, resending the transaction data to the second data provider system.

10. A computer-implemented method comprising:
from a data consumer system associated with an entity, receiving a query to read data from a data pool;
identifying, for the entity, a local instance of the data pool of a plurality of instances of the data pool, each instance stored on a corresponding data provider system, of a plurality of data provider systems, for a respective entity of a plurality of entities;
based at least in part on the query, generating transaction data to read data from the local instance of the data pool, the transaction data comprising identifying information for the entity associated with the query;
in response to sending the transaction data to a data provider system hosting the local instance of the data pool for the entity, receiving a response to the transaction data, the response comprising one or more authorized data sets that satisfy the query;
wherein the one or more authorized data sets are selected from a plurality of data sets based on:
a) the plurality of data sets satisfying the query, and
b) the one or more authorized data sets, from the plurality of data sets, satisfying one or more conditions specified by a set of rules;
wherein at least one condition of the one or more conditions is that the identifying information included in the transaction data indicates one or more entities that are authorized to use the one or more authorized data sets.

11. The method of claim 10, wherein the one or more authorized data sets, from the plurality of data sets, satisfies the one or more conditions specified by the set of rules based at least in part on the identifying information of the transaction data and permission data associated with the plurality of data sets.

12. A system comprising one or more processors, one or more storage media storing one or more computer programs for execution by the one or more processors, the one or more computer programs configured to perform a method comprising:
receiving a write request to store a data entry associated with an originating entity, of a plurality of entities, into a data pool of the plurality of entities;
wherein each of a plurality of instances of the data pool are stored on a corresponding data provider system of a plurality of data provider systems, each of the plurality of data provider systems associated with a different entity of the plurality of entities;
based at least in part on the write request, generating transaction data for the write request to store the data entry, the transaction data at least in part defining one or more rule sets for accessing the data entry;
wherein the one or more rule sets specify one or more conditions that must be satisfied by a read request before the read request is authorized to access the data entry;
sending, to the plurality of data provider systems, the transaction data, thereby causing storing the data entry in the plurality of instances of the data pool;
wherein sending, to the plurality of data provider systems, the transaction data further causes storing permission data describing the one or more rule sets for accessing the data entry in association with the data entry.

13. The system of claim 12, wherein the transaction data includes a digital signature associated with the originating entity.

14. The system of claim 12, wherein a recipient instance of the data pool stores a chain of data blocks, and the method further comprising generating a new data block in the chain of data blocks of the data pool, the new data block comprising the data entry and permission data describing the one or more rule sets for accessing the data entry.

15. The system of claim 12, wherein the method further comprising:
receiving a response from a recipient data provider system, of the plurality of data provider systems, associated with a recipient entity, the recipient data provider system hosting a recipient instance of the data pool;
wherein the response acknowledges that the recipient data provider system has successfully prepared the recipient instance of the data pool for update with the data entry.

16. The system of claim 12, wherein the method further comprising:
receiving a plurality of responses from the plurality of data provider systems;
wherein each of the plurality of responses comprises a different transaction identifiers for each of the plurality of entities;
storing the different transaction identifiers in association with the data entry.

17. The system of claim 12, wherein the method further comprising:
receiving a plurality of responses from the plurality of data provider systems;
based on the plurality of responses, determining that a first data provider system of the plurality of data provider systems has successfully prepared a first instance of the data pool, on the first data provider system, for update with the data entry, while a second data provider system of the plurality of data provider systems has failed to successfully prepared a second instance of the data pool, on the second data provider system, for update with the data entry;
based on the determining, canceling the write request to store the data entry into the plurality of instances of the data pool.

18. The system of claim 12, wherein the method further comprising:
receiving a plurality of responses from the plurality of data provider systems;
based on the plurality of responses, determining that a first data provider system of the plurality data provider systems has successfully prepared a first instances of the data pool, on the first data provider system, for update with the data entry, and a second data provider system of the plurality of data provider systems has failed to successfully prepare a second instance of the data pool, on the second data provider system, for update with the data entry;
based on determining that the second data provider system has failed to successfully prepare the second instance of the data pool for update with the data entry, resending the transaction data to the second data provider system.

* * * * *